US008953209B2

(12) United States Patent
Ida et al.

(10) Patent No.: US 8,953,209 B2
(45) Date of Patent: Feb. 10, 2015

(54) SERVER APPARATUS, IMAGE FORMING SYSTEM, AND METHOD OF MANAGING PRINT DATA

(71) Applicants: Kabushiki Kaisha Toshiba, Minato-ku, Tokyo (JP); Toshiba Tec Kabushiki Kaisha, Shinagawa-ku, Tokyo (JP)

(72) Inventors: Toshihiro Ida, Shizuoka-ken (JP); Kazuhiro Ogura, Kanagawa-ken (JP); Shinji Makishima, Shizuoka-ken (JP); Akihiro Mizutani, Shizuoka-ken (JP); Yusuke Hamada, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/095,394

(22) Filed: Dec. 3, 2013

(65) Prior Publication Data

US 2014/0092434 A1 Apr. 3, 2014

Related U.S. Application Data

(63) Continuation of application No. 13/169,125, filed on Jun. 27, 2011, now Pat. No. 8,625,138.

(60) Provisional application No. 61/359,173, filed on Jun. 28, 2010.

(51) Int. Cl.
*G06F 15/00* (2006.01)
*G06F 3/12* (2006.01)
(Continued)

(52) U.S. Cl.
CPC ............ *G06F 3/1258* (2013.01); *G06F 3/1222* (2013.01); *G06F 3/1267* (2013.01);
(Continued)

(58) Field of Classification Search
CPC ... G06F 3/1258; G06F 3/1222; G06F 3/1267; G06F 3/1288; H04N 1/0023; H04N 1/00233; H04N 1/00244; H04N 1/4413; H04N 1/0094
USPC ................................ 358/1.1, 1.15, 1.14, 1.13
See application file for complete search history.

(56) References Cited

U.S. PATENT DOCUMENTS

| | | | | |
|---|---|---|---|---|
| 7,474,862 | B2 * | 1/2009 | Shouno | 399/80 |
| 8,125,664 | B2 | 2/2012 | Tomita | |

(Continued)

FOREIGN PATENT DOCUMENTS

| | | |
|---|---|---|
| JP | 2006-260023 | 9/2006 |
| JP | 2009-075976 | 4/2009 |

OTHER PUBLICATIONS

Office Action for Chinese Patent Application No. 201110175618.8 Dated Apr. 17, 2014, 20 pgs.
U.S. Office Action mailed Jun. 19, 2013 corresponding to U.S. Appl. No. 13/169,125, filed Jun. 27, 2011.

*Primary Examiner* — Douglas Tran
(74) *Attorney, Agent, or Firm* — Amin, Turocy & Watson, LLP

(57) ABSTRACT

According to one embodiment, a server apparatus includes a reception unit, a storage unit, a list sending unit, and a transmission unit. The reception unit receives print data designating a user who is able to execute printing. The storage unit stores the print data received by the reception unit. The list sending unit sends a list of the print data, which the user who is an operator of an image forming apparatus is able to execute, to the image forming apparatus. The transmission unit transmits the print data selected from the list of the print data sent by the list sending unit to the image forming apparatus.

8 Claims, 16 Drawing Sheets

(51) Int. Cl.
*G06K 1/00* (2006.01)
*H04N 1/00* (2006.01)
*H04N 1/44* (2006.01)

(52) U.S. Cl.
CPC ............ *G06F3/1288* (2013.01); *H04N 1/0023* (2013.01); *H04N 1/00233* (2013.01); *H04N 1/00244* (2013.01); *H04N 1/4413* (2013.01); *H04N 2201/0094* (2013.01)
USPC ......................... 358/1.15; 358/1.13; 358/1.14

(56) References Cited

U.S. PATENT DOCUMENTS

| | | | | |
|---|---|---|---|---|
| 8,310,703 | B2 | 11/2012 | Nuggehalli et al. | |
| 8,422,044 | B2 * | 4/2013 | Miyashita | 358/1.14 |
| 8,422,063 | B2 | 4/2013 | Nishida | |
| 2008/0100863 | A1 | 5/2008 | Funahashi | |
| 2010/0177340 | A1 | 7/2010 | Huster et al. | |
| 2010/0182640 | A1 | 7/2010 | Daigo | |

* cited by examiner

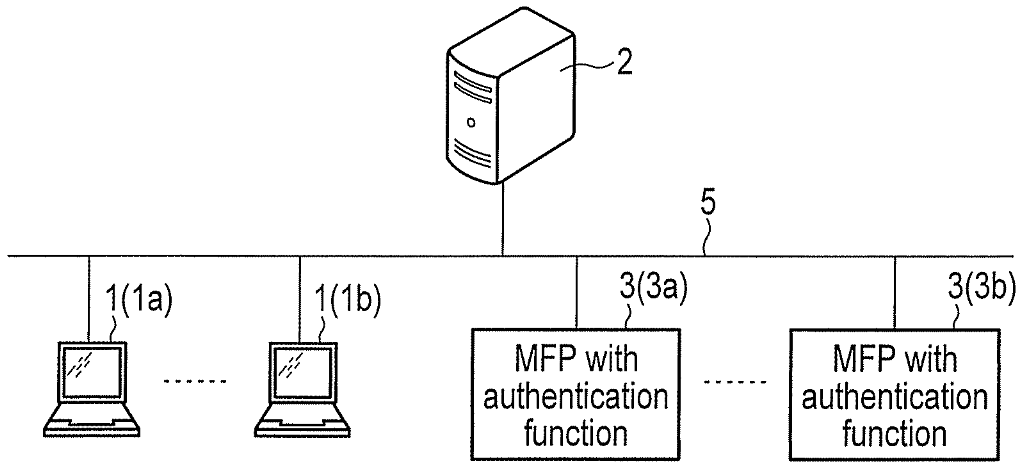
F I G. 1
```
PJL SEDER=UserA
PJL RECEIVER =UserB,GroupA
PJL PASS=0
    ⋮
(Image information)
```
F I G. 2

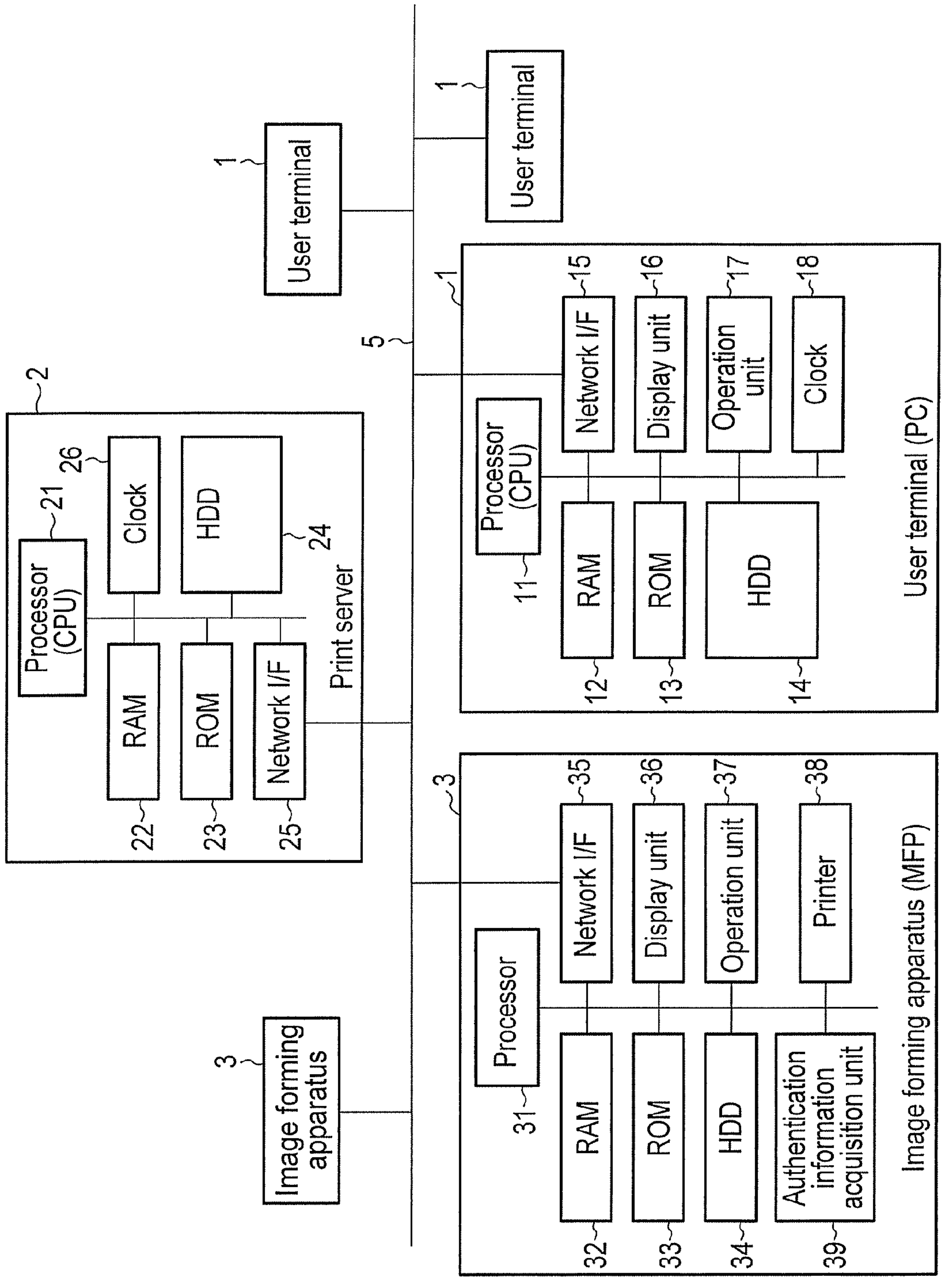
F I G. 3

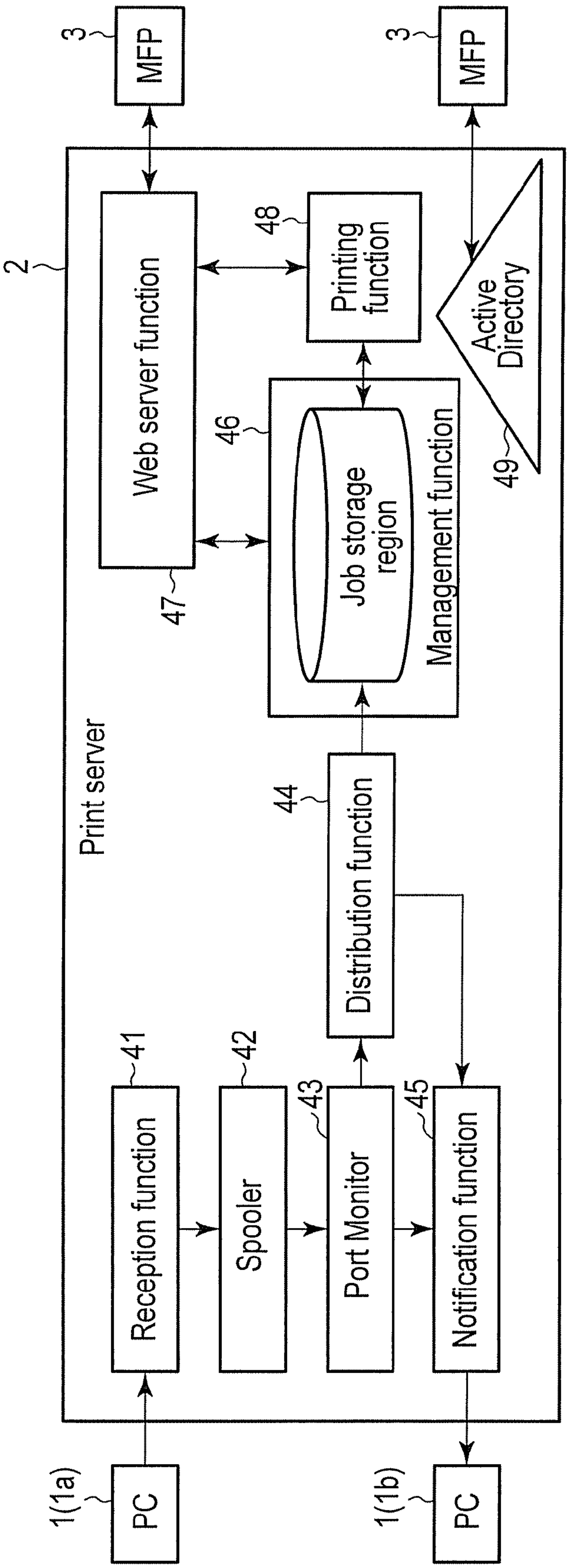
F I G. 4

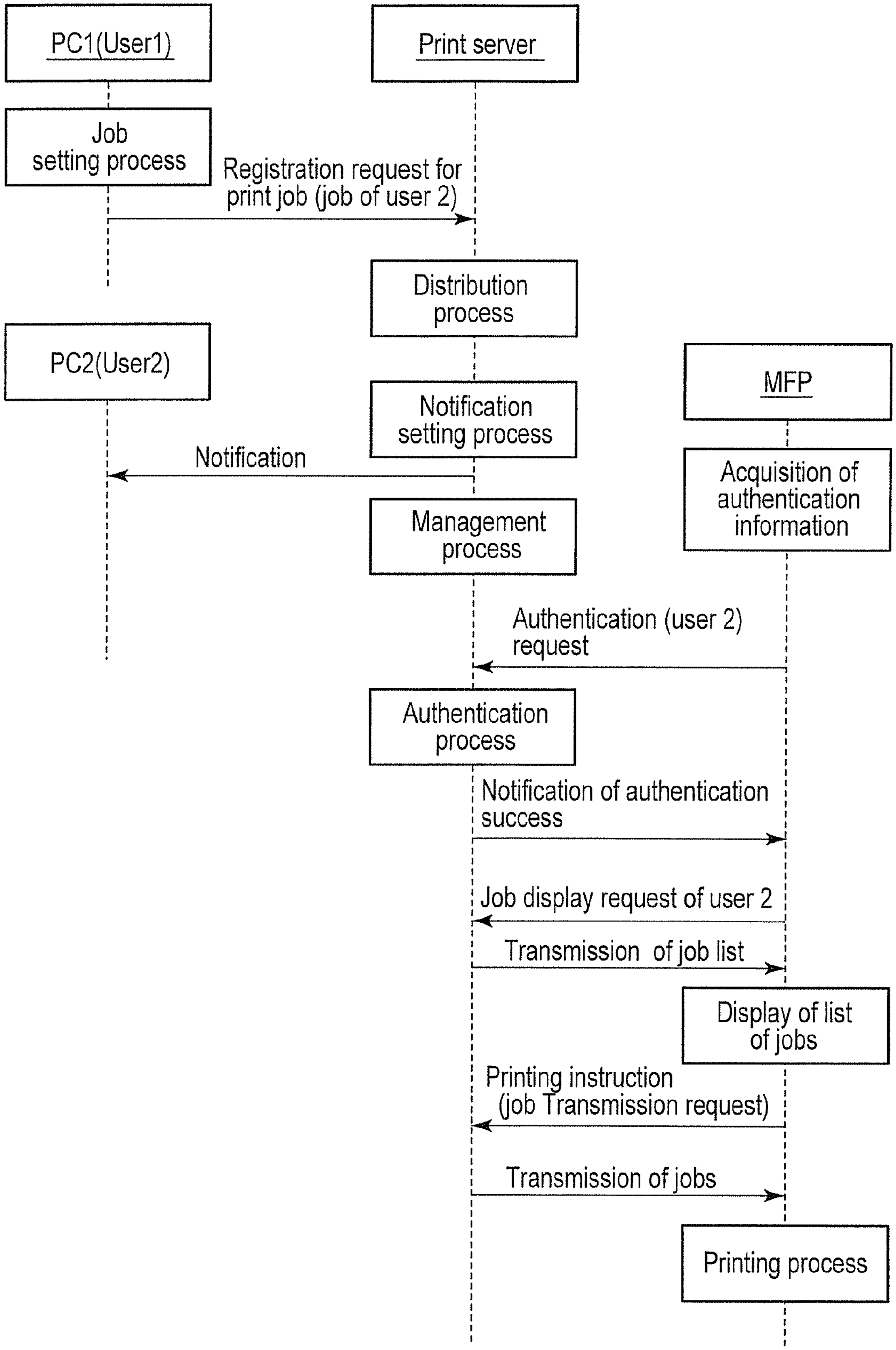
F I G. 5

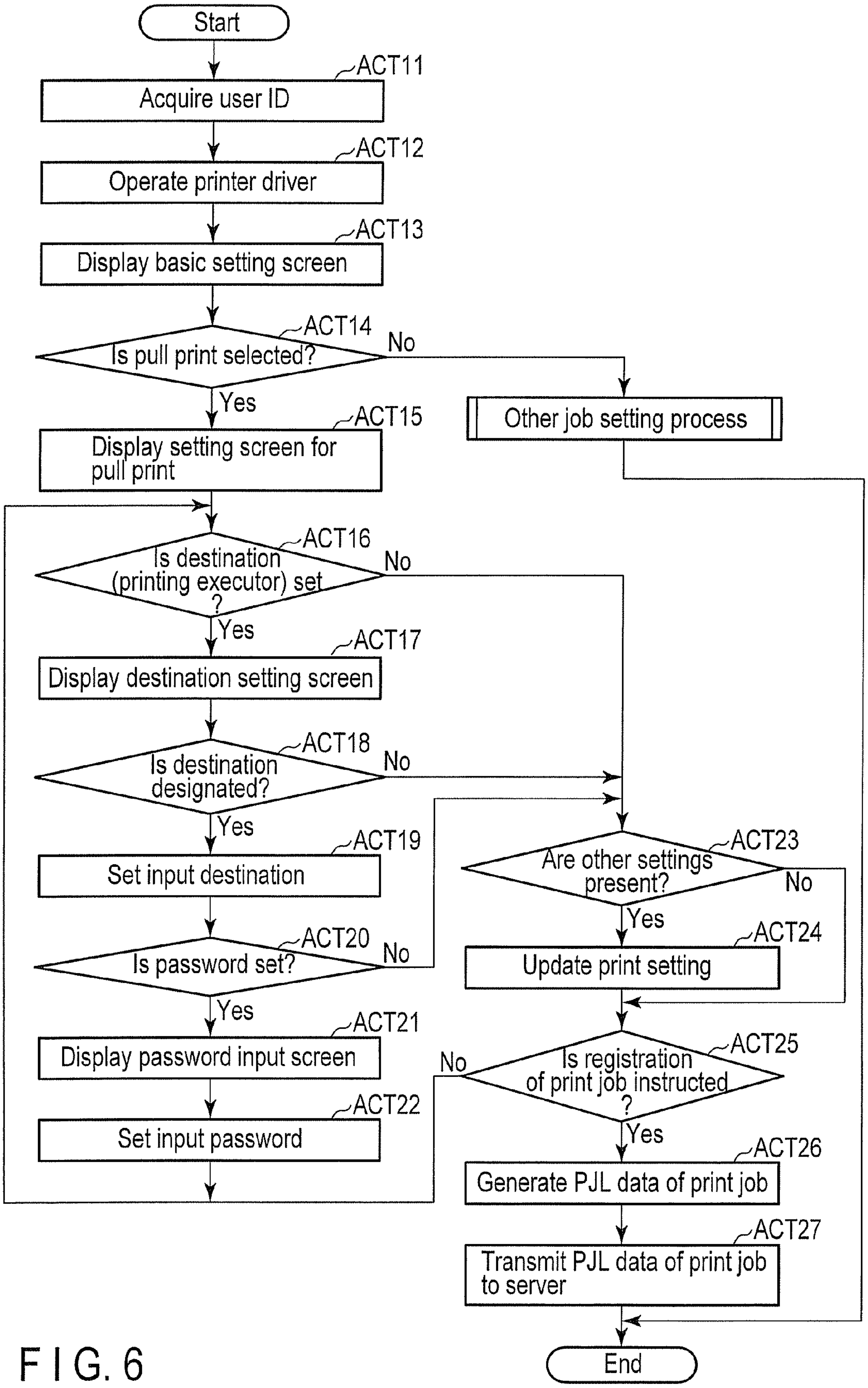
F I G. 6

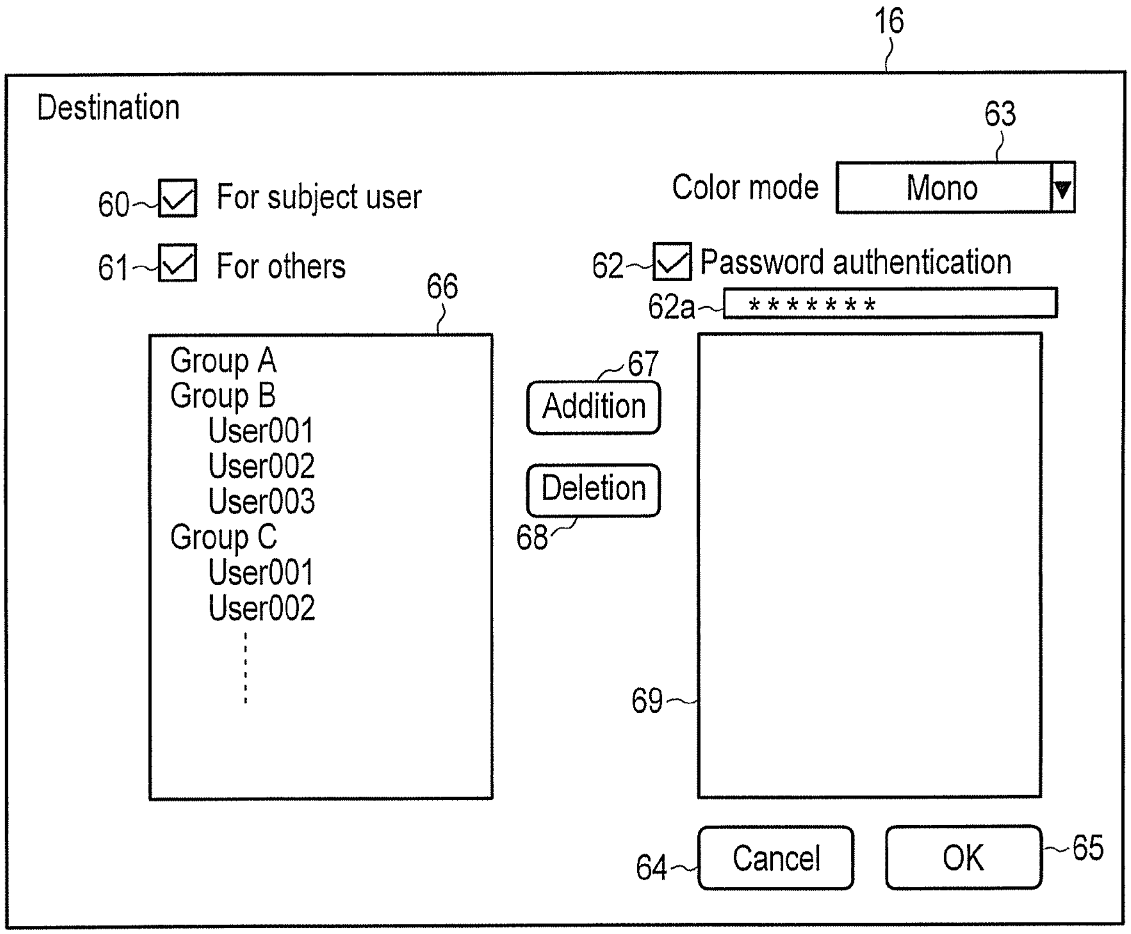
F I G. 7

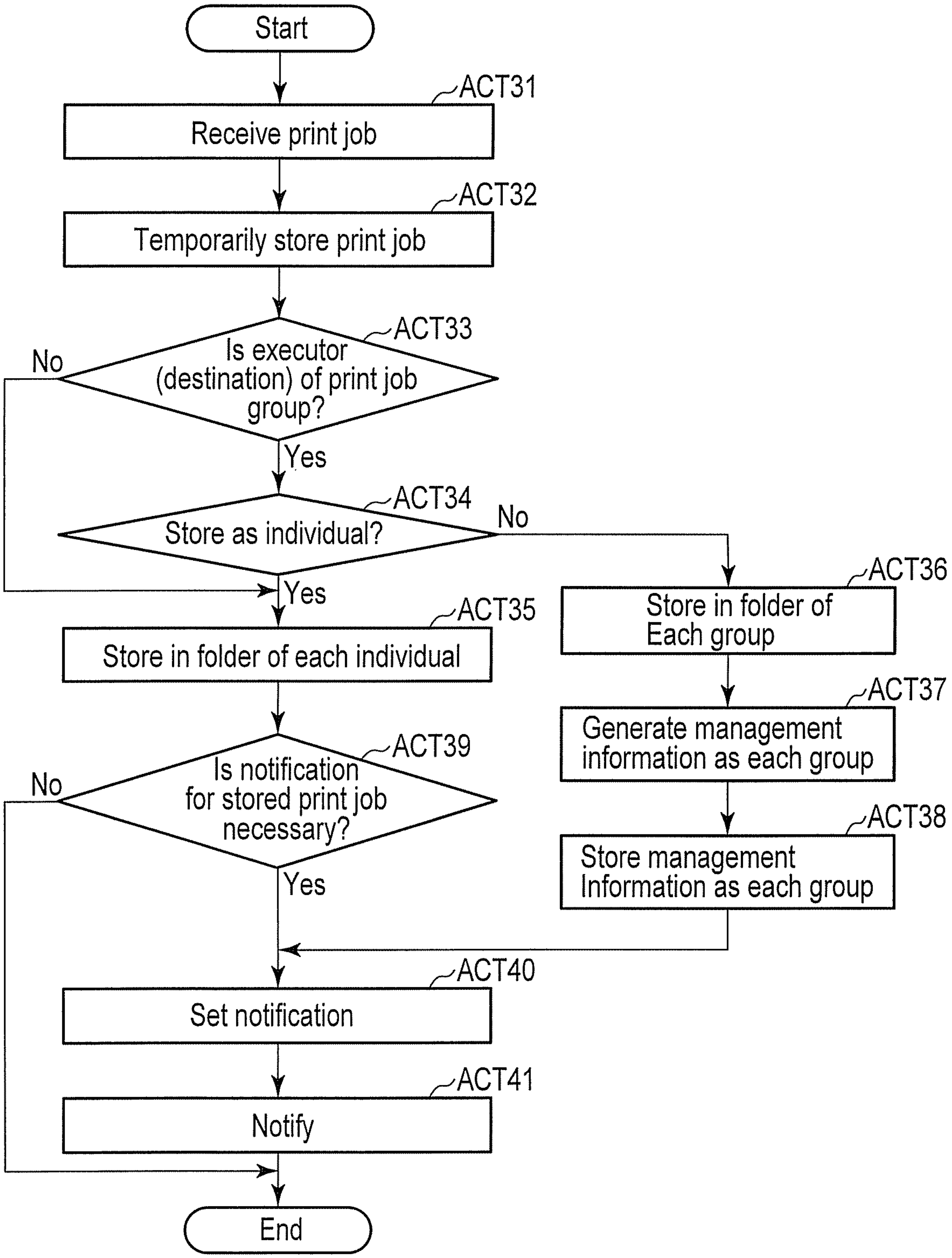
F I G. 8

```
<JobManager>
<Job>
  <Title>Title111</Title>
   <Role>FullColor</Role>
  <Count>5</Count>
  <Time></Time>
</Job>
   ⋮
</JovManager>
```

FIG. 11

```
<JovManager>
<Job>
  <Title>Title222</Title>
   <Role>Mono</Role>
  <Count></Count>
  <Time>60</Time>
</Job>
   ⋮
</JovManager>
```

FIG. 12

```
<RoleManager>
<Role>
  <ColorMode>FullColor</Title>
  <Duplex>0</Count>
  <Nin1>1</Nin1>
</Role>
<Role>
   <ColorMode>Mono</Title>
  <Duplex>1</Count>
  <Nin1>2</Nin1>
</Role>
   ⋮
</RoleManager>
```

FIG. 13

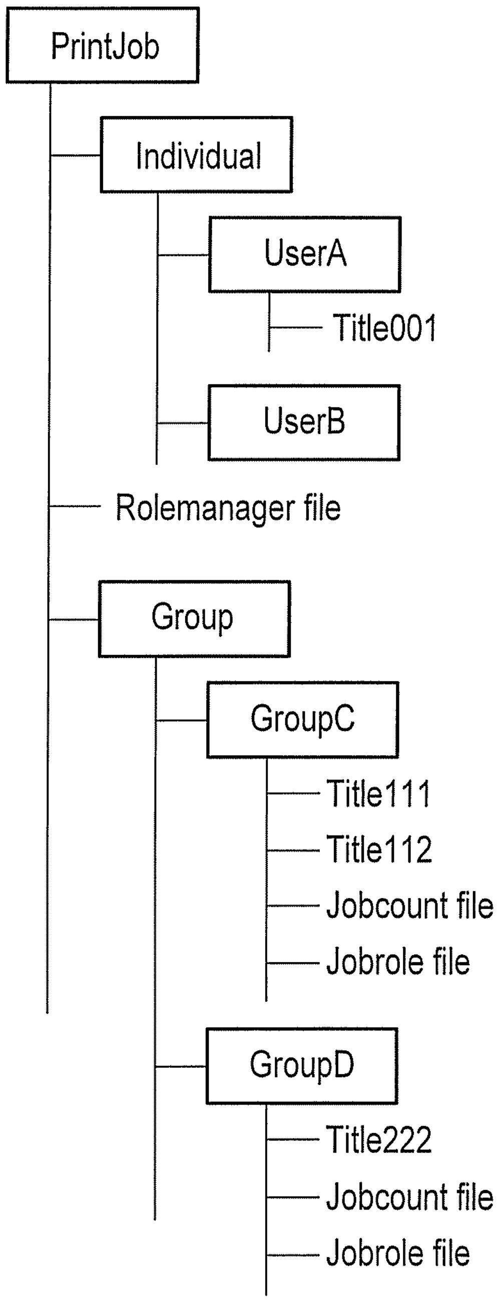
F I G. 14

```
<JobCount>
<Job>
  <Title>Title111</Title>
  <Count>5</Count>
  <Time>12</Time>
</Job>
<Job>
  <Title>Title112</Title>
  <Count>5</Count>
  <Time>12</Time>
</Job>
    ⋮
</JobCount>
```

FIG. 15

```
<JobRole>
<Job>
  <Title>Title111</Title>
  <Role>FullColor</Role>
</Job>
<Job>
  <Title>Title112</Title>
  <Role>Mono</Role>
</Job>
    ⋮
</JobRole>
```

FIG. 16

```
<Group Name="GroupC">
<Users>
  <User>
  <Name>user001</Name>
  <PrintOut Name="Title111">0</PrintOut>
  <PrintOut Name="Title112">0</PrintOut>
  </User>
  <User>
  <Name>user002</Name>
  <PrintOut Name="Title111">1</PrintOut>
  <PrintOut Name="Title112">1</PrintOut>
  </User>
</Users>
```

FIG. 18

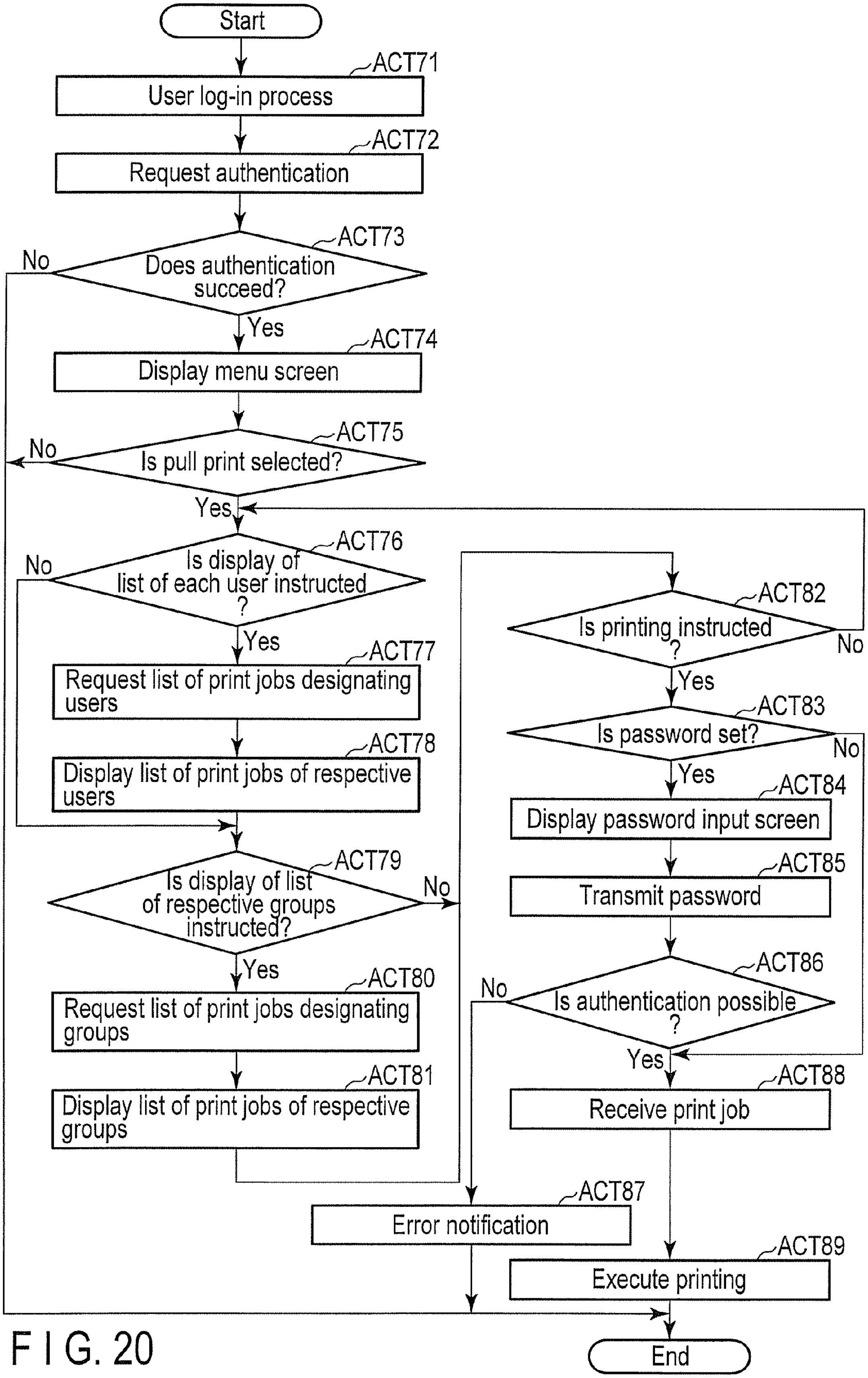
F I G. 20

|  | | | UserA |
|---|---|---|---|

Please select print job

User 71  Group 72   73

| Title | Time | | Transmission source |
|---|---|---|---|
| Title_100 | 12,16:00 | | UserA |
| Title_033 | 12,15:33 | | UserA |
| Title_010 | 12,12:03 | | UserA |
| Meeting data A | 12,09:33 | | UserC |
| Secret data A | 12,09:30 | 🔑 | UserC |

1/3

| Deletion | Clear | All selection | Print |
|---|---|---|---|
| 75 | 76 | 77 | 78 |

|  | | | UserA |
|---|---|---|---|

Please select print job

User 71  Group 72   74

| Title | Time | | Group |
|---|---|---|---|
| Title_020 | 12,12:03 | | GroupA |
| Meeting data C | 12,09:33 | | GroupA,C |
|  |  |  |  |
|  |  |  |  |
|  |  |  |  |

1/1

| Deletion | Clear | All selection | Print |
|---|---|---|---|
| 75 | 76 | 77 | 78 |

SERVER APPARATUS, IMAGE FORMING SYSTEM, AND METHOD OF MANAGING PRINT DATA

CROSS-REFERENCE TO RELATED APPLICATIONS

This application is a Continuation of application Ser. No. 13/169,125 filed Jun. 27, 2011, which is based upon and claims the benefit of priority from U.S. Provisional Application No. 61/359,173 filed on Jun. 28, 2010; the entire contents of both of which are incorporated herein by reference.

FIELD

Embodiments described herein relate generally to a server apparatus, an image forming system, and a method of managing print data.

BACKGROUND

An image forming system accumulates print jobs set by a user terminal as print data in a server apparatus, reads the print data accumulated in the server apparatus from an image forming apparatus, and forms an image. In an image forming system according to the related art, an image forming apparatus executes printing based on the print data accumulated in the server apparatus through an operation of a sender sending the print data to a server.

BRIEF DESCRIPTION OF THE DRAWINGS

FIG. 1 is a diagram schematically illustrating an example of the configuration of an image forming system.

FIG. 2 is a diagram illustrating an example of the structure of a print job.

FIG. 3 is a block diagram illustrating an example of the configuration of each control system of a user terminal, a print server, and an image forming apparatus.

FIG. 4 is a diagram illustrating a management function of the print job in the print server.

FIG. 5 is a diagram illustrating a sequence to explain an example of PULL print in the image forming system.

FIG. 6 is a flowchart illustrating an example of a process of setting the PULL print in the user terminal.

FIG. 7 is a diagram illustrating a display example of a destination setting screen for the print job.

FIG. 8 is a flowchart illustrating an example of a process of registering a job of the PULL print in the print server.

FIG. 11 is a diagram illustrating an example of the structure of a JobManager file.

FIG. 12 is a diagram illustrating an example of the structure of a JobManager file.

FIG. 13 is a diagram illustrating an example of the structure of a RoleManager file.

FIG. 14 is a diagram illustrating a third storage form of the print job in the print server.

FIG. 15 is a diagram illustrating an example of the structure of a JobCount file.

FIG. 16 is a diagram illustrating an example of the structure of a JobRole file.

FIG. 18 is a diagram illustrating an example of the structure of a Users file.

FIG. 20 is a flowchart illustrating an execution process of the print job in the image forming apparatus.

DETAILED DESCRIPTION

Figure 9:
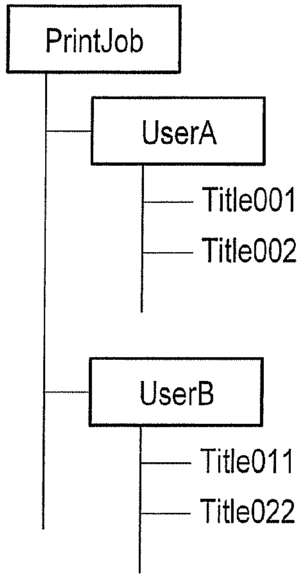
FIG. 9 is a diagram illustrating a first storage form of the print job in the print server.

In general, according to one embodiment, a server apparatus includes a reception unit, a storage unit, a list sending unit, and a transmission unit. The reception unit receives print data designating a user who is able to execute printing. The storage unit stores the print data received by the reception unit. The list sending unit sends a list of the print data executable by a user, who is an operator of an image forming apparatus, to the image forming apparatus. The transmission unit transmits the print data selected from the list sent by the list sending unit to the image forming apparatus.

Hereinafter, embodiments will be described in detail with reference to the drawings.

FIG. 1 is a diagram schematically illustrating an example of the configuration of an image forming system.

In the example of the configuration shown in FIG. 1, the image forming system includes a plurality of user terminals 1, the print server 2, and a plurality of image forming apparatuses 3. In the image forming system, the respective user terminals 1, the print server 2, and the respective image forming apparatuses 3 are connected to a network 5. The network 5 is constructed by wired or wireless communication. The network 5 is not limited to a network in a local network area. For example, the network 5 may include a wide area network such as the Internet.

The image forming system is a system that has a function (referred to as PULL print) of accumulating the print jobs requested from the user terminal 1 by users in the print server 2 and executing the print jobs accumulated in the print server 2 in response to an operation executed in the image forming apparatus 3 by the user.

The user terminal 1 is a terminal apparatus that is used by the user. The user terminal 1 may be an apparatus that can execute communication via the network 5. For example, the user terminal 1 may be a personal computer (PC) or a portable terminal apparatus. The user terminal 1 has a user identification function of acquiring user identification information used to uniquely specify a user. Further, the user terminal 1 may execute user authentication using an authentication function of the print server 2. In this embodiment, it is assumed that the user terminal 1 acquires the user identification information when the user terminal 1 instructs at least the PULL print.

The user terminal 1 operates a printer driver program (hereinafter, referred to as a printer driver) for the PULL print in response to a print instruction from the user. The user terminal 1 generates the print job (print data) indicating the print contents instructed by the user, when a processor executes the printer driver. The user terminal 1 attaches the user identification information regarding a sender to the print job. Further, when the user terminal 1 permits the user other than the sender to execute printing based on the print job, the user terminal 1 attaches information indicating identification information or a group of the users who are able to execute the printing to the print job. The user terminal 1 transmits the generated print job to the print server 2.

FIG. 2 is a diagram illustrating an example of the structure of the print data as the print job transmitted from the user terminal 1 to the print server 2. The print data shown in FIG. 2 is print data in which the contents of the print job including print setting information are described with a PJL (Print Job language). PJL data indicating the contents of the print job includes setting information regarding the print job and image data to be printed.

In the example shown in FIG. 2, the setting information regarding the print job includes information (SENDER) indicating the sender, information (RECEIVER) indicating a receiver as a user who is able to execute the print job, and information (PASS) indicating whether there is a password. Further, the sender of the print job may be specified by the print server 2. For example, the print server 2 may specify a user based on information acquired from the user terminal 1 connected to transmit the print job.

The information (SENDER) indicating the sender is information regarding a user requesting registration of the print job. The information (RECEIVER) indicating the receiver is information regarding a user who is able to execute the print job. The receiver includes the user other than the sender. Further, the information (RECEIVER) indicating the receiver may be information indicating not only an individual user but also a group to which the plurality of users belong.

The information (PASS) indicating whether there is a password is information indicating whether a password is set to execute the print job. For example, if "PASS=0" is set, no password is set. If "PASS=1" is set, a password is set. The password itself may be included in the PJL data of the print or may be separately set.

The print server 2 is configured by a server computer. The print server 2 has a function of communicating with each user terminal 1 and each image forming apparatus 3 via the network 5. The print server 2 receives the print job (print data) requested from the user terminal 1. The print server 2 stores the print jobs and manages the users or a group that is able to execute printing based on the print job.

The print server 2 has a user authentication function. The print server 2 authenticates the user operating the image forming apparatus 3. The print server 2 supplies the list of the print jobs executable by the user or transmits the print job in response to a request from the user who succeeds in the authentication.

Each image forming apparatus 3 may be configured by, for example, a digital multi function peripheral (MFP). The image forming apparatus 3 has a printer function, a network communication function, and a user identification (user authentication) function. The image forming apparatus 3 determines the user identification information used to specify the user as an operator by the user identification function. The user identification information may be information by which the print server 2 can determine the user associated with the job. For example, the user identification information may be user ID input by the operator who logs in the image forming apparatus 3, a password input by the operator, or information obtained as the result of the user authentication process based on authentication information such as biological information.

When the image forming apparatus executes the PULL print, the image forming apparatus 3 acquires the authentication information from a user and executes the authentication function of the print server 2 to authenticate the user. If the user authentication succeeds, the image forming apparatus 3 asks the print server 2 for the list of the print jobs that the user is able to execute. For example, the image forming apparatus 3 transmits a query (transmission request for the print job list) for the print job corresponding to the user identification information obtained by the user identification function to the print server 2 via the network 5. The image forming apparatus 3 displays the list of the print jobs acquired from the print server 2. The image forming apparatus 3 acquires the print jobs that the user instructs to print from the print server 2 and executes the printing.

Next, the configuration of each control system of the user terminal 1, the print server 2, and the image forming apparatus 3 will be described.

FIG. 3 is a block diagram illustrating an example of the configuration of each control system of the user terminal 1, and the print server 2, and the image forming apparatus 3.

First, the configuration of the user terminal 1 will be described.

As shown in FIG. 3, each user terminal 1 includes a processor (CPU) 11, a RAM 12, a ROM 13, an HDD 14, a network interface (I/F) 15, a display unit 16, an operation unit 17, and a clock 18.

For example, the processor 11 is a CPU. The processor 11 controls the entire user terminal 1. The processor 11 realizes various kinds of processing functions by executing programs stored in the ROM 13 or the HDD 14. The RAM 12 is a working memory. The ROM 13 stores a control program, control data, or the like for controlling the basic operations of the user terminal 1. The HDD 14 is a storage device that stores data. For example, the HDD 14 stores data such as an image to be printed, an application program (for example, a printer driver) executed by the processor 11, user authentication data, and the like.

The network interface 15 is an interface that executes data communication with each of the apparatuses connected to the network 5. The display unit 16 displays an operation guide or the like. For example, the display unit 16 displays a print setting screen (print instruction screen) when the processor 11 executes the printer driver. The operation unit 17 is used when a user inputs information. For example, the operation unit 17 is configured by a keyboard and a mouse, or a touch panel provided in the display unit 16. The clock 18 counts a current time.

In the user terminal 1, the processor 11 realizes the user identification function by executing a program. The user identification function may be a user ID input by the user in a log-in process or user information acquired through an identification process with authentication information such as a password. For example, the user inputs the user ID in the log-in process of the user when the user terminal 1 is operated. The user identification information may be acquired by a user authentication process executed when the user instructs the PULL print.

In the user terminal 1, the processor 11 receives the user setting and registration of the PULL print by executing the printer driver for executing the PULL print. For example, the processor 11 displays the print setting screen of the PULL print on the display unit 16 by executing the printer driver and receives print setting contents of the operation unit 17 from the user. When the user instructs to execute (register) the PULL print, the processor 11 generates the job file (print data) indicating the print contents and transmits the generated job file to the print server 2.

Next, the configuration of the print server 2 will be described.

As shown in FIG. 3, the print server 2 includes a processor (CPU) 21, a RAM 22, a ROM 23, an HDD 24, and a network interface (I/F) 25, and a clock 26.

For example, the processor 21 is a CPU. The processor 21 controls the entire print server 2. The processor 21 realizes various kinds of processing functions by executing programs stored in the ROM 23 or the HDD 24. The processor 21 executes a program to realize a management function of the print job. The RAM 22 is a working memory. The ROM 23 stores a control program, control data, or the like for controlling the basic operations of the print server 2.

The network interface 25 is an interface that executes data communication with each of the apparatuses connected to the network 5. The clock 26 counts a current time. The HDD 24 is a storage device that stores data. The HDD 24 stores a program used to realize the management function of the print job. Further, the HDD 24 stores the print jobs (job files), management information regarding the print jobs, and the like.

Next, the configuration of the image forming apparatus 3 will be described.

As shown in FIG. 3, the image forming apparatus 3 includes a processor (CPU) 31, a RAM 32, a ROM 33, an HDD 34, a network interface (I/F) 35, a display unit 36, an operation unit 37, a printer 38, and an authentication information acquisition information unit 39.

For example, the processor 31 is a CPU. The processor 31 realizes various kinds of processing functions by executing programs stored in the ROM 33 or the HDD 34. The RAM 32 is a main memory that functions as a working memory. The ROM 33 stores a control program, control data, or the like for controlling the operations of the image forming apparatus 3. The HDD 34 is a storage device that stores data. The network interface 35 is an interface that communicates with each of the print servers 2 via the network 5.

The display unit 36 displays an operation guide or the like. The operation unit 37 is used when a user inputs information. The display unit 36 and the operation unit 37 are configured by an operation panel provided with a display device that has a hard key and a touch panel therein. When the PULL print is executed using the job file registered in the print server 2, the user inputs the user identification information through the operation unit 37 and instructs to execute printing using the job file corresponding to the user identification information acquired from the print sever 2.

The printer 38 forms image data included in the print data on a sheet with color or monochrome under the print condition included in the job file (print data). For example, the printer 38 is an electrophotographic image forming apparatus. However, the printer 38 is not limited to the electrophotographic image forming apparatus, but may be an image forming apparatus that forms an image by an inkjet type or a thermal transfer type.

The authentication information acquisition unit 39 acquires user authentication information. For example, when the authentication information is acquired from an IC card carried by the user, the authentication information acquisition unit 39 is configured by an IC card reader. Further, when biological information regarding a user is acquired as the authentication information, the authentication information acquisition unit 39 acquires the biological information from the user. Furthermore, when a user inputs authentication information such as a password, the authentication information acquisition unit 39 is configured by a keyboard or the like. In this case, the authentication information acquisition unit 39 may be the operation unit 37.

Next, the management function of the print job in the print server 2 will be described.

FIG. 4 is a diagram illustrating the management function of the print job in the print server 2.

As shown in FIG. 4, the print server 2 includes, as management functions of the print jobs, a reception function 41, a spooler 42, a port monitor 43, a distribution function (registration function) 44, a notification function 45, a management function 46, a Web server function (data input and output function) 47, a printing function (temporary) 48, and an Active Directory (user account (authentication) function) 49.

The reception function 41 is a function of receiving the print job transmitted from the user terminal 1 through the communication interface 25. The spooler 42 temporarily stores the print job received by the reception function 41. The port monitor 43 monitors the reception status of the print job and uniquely assigns a file name to the print job (print data) temporarily stored in the spooler 42.

The distribution function 44 determines the user who is able to execute the temporarily stored print job. The distribution function 44 specifies the user or the group that is able to execute the print job based on designation information included in the print job. The distribution function 44 distributes and stores the print jobs to folders (folders of respective user names) provided in a JOB storage region 46*a* and corresponding to the respective users or folders (folders of respective group names) corresponding to the respective groups based on the user or the group that is able to execute the print job.

For example, when the user who is able to execute the print job is designated as an individual, the distribution function 44 stores the print job in a folder provided in the JOB storage region 46*a* and corresponding to the user. When the user who is able to execute the print job is designated as a group, the distribution function 44 specifies each user belonging to the group and stores the print job in a folder corresponding to the user. Further, when the user who is able to execute the print job is designated as a group, the distribution function 44 may store the print job in a folder provided in the JOB storage region 46*a* and corresponding to the group.

The notification function 45 notifies each user who is a user other than the sender of the print job and is able to execute the print job of the fact that the print job is stored (registered). The notification function 45 notifies each user of the registration of the print job using an electronic mail, a pop-up, a ticker (RSS, gadget), or the like. For example, when an electronic mail is used, the notification function 45 may include a mail server function.

The management function 46 manages the print jobs stored in the JOB storage region 46*a*. The JOB storage region 46*a* stores the print jobs distributed to the folder of each user or each group by the distribution function 44. The management function 46 includes a function of retrieving the print jobs stored in each folder of the JOB storage region 46*a*. For example, the management function 46 generates the list of the print jobs that a specific user is able to execute or extracts the print job designated by a printing instruction (transmission request).

The management function 46 has a function of deleting the print job stored in each folder of the JOB storage region 46*a* under a predetermined condition. For example, the management function 46 deletes the print job of which the printing (transmission) is completed by the user who is able to execute the print job. The management function 46 stores each print job only during a predetermined storage period. The management function 46 automatically deletes the print job that is not executed during the predetermined storage period.

The Web server function 47 supplies information supplied to the image forming apparatus 3 as the display data to be displayed on the display unit 36. For example, the Web server function 47 supplies the list of the print jobs or the like, which the user designated by the image forming apparatus 3 is able to execute, as the display data to be displayed on the display unit 36. The Web server function 47 also supplies the print setting screen or the like for the printing of the print job designated by the user to the image forming apparatus 3.

The Web server function 47 acquires information input by the user from the display screen of the display unit 36 of the image forming apparatus 3. For example, the Web server function 47 acquires a transmission request for the list of the print jobs instructed by the user in the image forming apparatus 3, the printing instruction (transmission request) for a specific print job, or the like. The Web server function 47 acquires information such as a password input by the user in the image forming apparatus 3.

The printing function 48 receives a printing instruction from the image forming apparatus 3 and extracts the print job instructed to be printed from the print job stored in the JOB storage region 46*a* by the management function 46. The printing function 48 transmits the print job instructed to be printed to the image forming apparatus 3 by the Web server function 47.

The Active Directory 49 has a user account function (authentication function). For example, the Active Directory 49 authenticates the user who logs in the image forming apparatus 3. Further, the Active Directory 49 may manage information such as a mail address as a notification destination of the information regarding each user. For example, the Active Directory 49 may manage information (for example, a mail address) indicating the notification destination of each user who is able to execute the print job by the notification function 45.

Next, an overview of the PULL print process in the image forming system will be described.

FIG. 5 is a diagram illustrating a sequence to explain an example of the PULL print in the image forming system.

In the example shown in FIG. 5, an overview in which User 2 executes the print job of the PULL print set by User 1 is shown.

First, User 1 sets the print job by operating the user terminal 1 (PC1*a*) so that User 2 executes the set print job. For example, when the print job is set to the PJL data in the configuration shown in FIG. 3, PC1*a* generates the PJL data in which SENDER is set to User 1 and RECEIVER is set to User 2. When the PJL data of the print job is generated, PC1*a* transmits the PJL data of the print data generated in response to the registration request for the print job executed by User 2 to the print server 2.

The print server 2 distributes and stores the print job supplied from PC1*a* to the folder of User 2 by the distribution function 44. When the print server 2 stores the print job in the folder of User 2, the print server 2 generates a mail (sets notification for registration of the print job) to notify User 2 of the registration of the print job by the notification function 45 and transmits (notifies) the generated mail to User 2. After the print server 2 stores the print job in the folder of User 2, the print server 2 manages the print job stored in the folder of User 2 by the management function 46.

On the other hand, User 2 notified of the registration of the print job can execute the print job in any image forming apparatus (MFP) 3 connected to the print server 2. For example, the authentication information acquisition unit 39 of the MFP 3 in which User 2 logs in acquires the authentication information from User 2. The authentication information may be information read from an IC card carried by User 2 or may be information input from the operation unit by User 2. The MFP 3 transits the acquired authentication information along with the authentication request to the print server 2.

The print server 2 executes the user authentication process based on the authentication information transmitted along with the authentication request from the MFP 3. The print server 2 executes the user authentication process based on the authentication information from the MFP 3. The print server 2 transmits the authentication result obtained through the user authentication process to the image forming apparatus. In the example shown in FIG. 5, it is assumed that the print server 2 notifies the MFP 3 of the fact that the authentication of User 2 succeeds.

The MFP 3 notified of the fact that the authentication succeeds by the print server 2 requests the print server 2 to transmit the list of the print jobs that User 2 is able to execute as the PULL print in response to an operation of User 2. The list of the print jobs may be the list of the print jobs that User 2 is able to execute as an individual or may be the list of the print jobs that the group of User 2 is able to execute. The print server 2 generates the list of the print jobs of User 2 in response to the display request for the list of the print jobs of User 2 given from the MFP 3. The print server 2 transmits the list of the print jobs of User 2 as display data displayed on the display unit 36 to the MFP 3.

The MFP 3 displays the list of the print jobs of User 2 received from the print server 2 on the display unit 36. The display unit 36 displays the list of the print jobs of User 2 as a selection screen used for the user to select the print job. That is, User 2 selects the print job instructed to be printed from the list of the print jobs displayed on the display unit 36. When the user selects the print job to be printed, the MFP 3 transmits the printing instruction (transmission request for the print job) for the print job selected by the user to the print server 2. The print server 2 extracts the print job in response to the printing instruction (transmission request) from the MFP 3 and transmits the extracted print job to the MFP 3. When the MFP 3 receives the print job corresponding to the printing instruction from the print server 2, the printer 38 of the MFP 3 executes printing based on the print job.

As described above, the image forming system can register the print job for the PULL print designated by others other than the sender in the print server, notifies the execution person of the print job registered in the print server, and can execute the print job registered in the print server by each execution person including the others other than the sender in the MFP 3.

Hereinafter, an example of the operation of each apparatus in the PULL print will be described.

First, a process of setting the PULL print in the user terminal 1 will be described.

FIG. 6 is a flowchart illustrating an example of the process of setting the PULL print in the user terminal 1.

In the user terminal 1, the print job for the PULL print can be set in such a manner that the processor 11 executes the printer driver. In the operation example shown in FIG. 6, the user terminal 1 acquires the user ID of the user who operates the user terminal 1, before operating the printer diver (for example, operating the user terminal) (ACT 11). For example, the user terminal 1 acquires the user ID of the user as an operator in the log-in process. When the user executes the PULL print, the user gives a printing instruction through the operation unit 17 when the image data (or document data) to be printed is designated. If the processor 11 receives the printing instruction, the processor 11 operates the printer driver (ACT 12).

When the processor 11 operates the printer driver, the processor 11 displays a basic print setting screen on the display unit 16 (ACT 13). The kinds of print including the PULL print can be selected on the basic print setting screen. Basic setting items, such as a sheet size, a sheet discharging tray, a copy number, a printing direction, and a color mode, regarding the printing can be set on the basic print setting screen.

If the user selects the PULL print as a kind of job through the operation unit 17 on the basic print setting screen (YES in ACT 14), the processor 11 displays the print setting screen for the PULL print (ACT 15). For example, the processor 11 displays, on the display unit 16, the print setting screen for the PULL print that includes input keys used to instruct setting of a destination (printing executor), setting of a password, or other print settings.

If the processor 11 receives an instruction to set the destination on the print setting screen for the PULL print (YES in ACT 16), the processor 11 displays a destination setting screen used to designate the user (a receiver, a destination) that is able to execute the print job as the PULL print (ACT 17). The destination setting screen is a screen used to set the user who executes the print job. In this embodiment, the user other than the sender that sends (registers) the print job of the PULL print can execute the print job. The user (sender) setting the print job is assumed to set (transmit) the user who is able to execute the print job. That is, the user sets the user serving as the destination (executable user) other than himself or herself on the setting screen of the PULL print. If the destination other than himself or herself is designated on the destination setting screen (YES in ACT 18), the processor 11 sets the destination designated as the user (receiver) that is able to execute the print job (ACT 19).

FIG. 7 is a diagram illustrating a display example of the destination setting screen for the print job.

In the display example shown in FIG. 7, the display unit 16 displays a setting field 60 for the subject user, a setting field 61 for other users, a password setting field 62, a mode setting field 63, a cancel button 64, and an OK button 65. The setting field 60 for the subject user is a setting field used set whether the user himself or herself (the subject user) is permitted to execute the print job. The setting field 61 for other users is a setting field used to set whether others is permitted to execute the print job. The password setting field 62 is a setting field used to set existence or non-existence of a password. The mode setting field 63 is a setting field used to set the color mode. The cancel button 64 is a button used to instruct cancellation of the destination setting. The OK button 65 is a button used to instruct the confirmation of the destination setting.

When the user sets the setting field 61 for other users so that other users can execute the print job, the display unit 16 further displays a candidate list 66, an addition button 67, a deletion button 68, and a setting user list 69. The candidate list 66 is a list of candidates (users and groups) who can be selected (set) as other users who are able to execute the print jobs.

The user operates the operation unit 17 to select an individual user or a group that is able to execute the print job from the candidates displayed in the candidate list 66. For example, the user can select the candidate displayed in the candidate list 66 by touching a display portion on a touch panel serving as the operation unit 17. When the candidate displayed in the candidate list 66 is selected and the addition button 67 is instructed, the selected candidate is added to the setting user list 69 as a setting user.

The user can operate the operation unit 17 to select an individual user or a group from the setting user displayed in the setting user list 69. For example, the user can select the setting person displayed in the setting user list 69 by touching a display portion on the touch panel serving as the operation unit 17. When the setting person displayed in the setting user list 69 is selected and the deletion button 68 is instructed, the selected setting person is deleted from the setting user list 69.

When the user instructs a password for the print job in the password setting field 62, the display unit 16 displays a password input screen. The password input screen may be displayed as a display field 62*a* shown in FIG. 7 or may be displayed as another display window. In the mode setting field 63, the user can set a desired color mode. The mode setting field 63 may display a list of selectable modes so that a mode designated from the list is set.

When the destination is designated on the destination setting screen (YES in ACT 18), the processor 11 sets the destination designated as the user (receiver) that is able to execute the print job (ACT 19).

If the setting of a password is instructed on the destination setting screen (YES in ACT 20), the processor 11 displays the password input screen on the display unit 16 (ACT 21). The password input screen is a screen used to input the password necessary to execute the print job. When the user operates the operation unit 17 to input the password on the password input screen, the processor 11 sets the input password (ACT 22).

Each user is notified of the set password separately from the registration notification for the print job from the print server 2 described below. The password may be information determined in advance between the users or in the group.

If the setting contents other than the destination and the password are instructed on the destination setting screen (YES in ACT 23), the processor 11 updates the print setting in accordance with the instructed contents (ACT 24).

When the print setting is completed in this way, the user inputs the OK button 65 to instruct confirmation of the setting contents. That is, if the OK button 65 is input (YES in ACT 25), the processor 11 confirms the print setting contents and generates the data indicating the print job including the set print setting contents (ACT 26). The data indicating the print job is configured by the PJL data, as shown in FIG. 3. When the data indicating the print job is generated, the processor 11 transmits the PJL data of the print job to the print server 2 (ACT 27).

According to the above-described processes, the user terminal sets the print job that the user other than the sender designated by the sender is able to execute and can register the print job to the print server. Further, the user terminal can suggest the list of the users or the groups that is able to execute the print job and can register the print job, in which the user or the group selected from the list is designated as the executor (receiver) of the print job, in the print server. That is, the user can supply, as the print job, a print product that the user desires to send to other users.

Next, a process of registering the print job for the PULL print in the print server 2 will be described.

FIG. 8 is a flowchart illustrating an example of a process of registering a job of the PULL print in the print server 2.

The network interface 25 of the print server 2 receives the PJL data of the print job of the PULL print from the user terminal 1 via the network 5 (ACT 31). The processor 21 temporarily stores the PJL data of the print job received from the user terminal 1 in the spooler 42 (ACT 32).

The processor 21 of the print server 2 determines whether the executor (called a destination, a receiver, a user or the like that is able to execute the print job) of the received print job is designated as the group or as the individual user (ACT 33). For example, when the PJL data of the print job has the same configuration as that shown in FIG. 3, the processor 21 determines whether the receiver is a group name or an individual name in the received PJL data.

If the executor of the print job is designated as the individual user (NO in ACT 33), the processor 21 stores the print job of each designated individual user (ACT 35). For example, the processor 21 stores the PJL data of the print job in the folder (for example, a folder with an individual name) generated for each individual user. When there is no folder of the designated user, the processor 21 generates the folder of the user and stores the PJL data of the print job in the generated folder.

If the executor of the print job is designated as the group (YES in ACT 33), the processor 21 determines whether the print job is stored for each individual user or each group in accordance with the storage form of the print job in the print server 2 (ACT 34). If the processor 21 determines whether the print job is stored not for each group but for each individual user (YES in ACT 34), the processor 21 stores the print job of each of all the users belonging to the group (ACT 35). For example, the processor 21 stores the PJL data of the print data in the folder (for example, a folder with an individual name) of each of the users belonging to the group.

On the other hand, if the processor 21 determines whether the print job is stored for each group (NO in ACT 34), the processor 21 stores the print job of each group (ACT 35). For example, as the storage of each group, the processor 21 stores the PJL data of the print data in the folder (for example, a folder with a group name) generated for each group. When there is no folder of the designated group, the processor 21 generates the folder of this group and stores the PJL data of the print job in the generated folder.

When the processor 21 stores the print job of each group, the processor 21 generates the management information so that each user belonging to the group can manage the execution state or the like of the print job (ACT 37) and stores the generated management information (ACT 38). The management information regarding the print job is information that is necessary for the plurality of users belonging to the group to execute the print job. For example, the management information regarding the print job includes information used to count the execution number of the print job or information indicating the condition or the like that the print job is executed. The processor 21 stores a file (for example, a JobManager file, a JobCount file, a JobRole file, or the like) including the management information together with the print job in the folder of the group.

When the print jobs are distributed to the executors and are stored, the processor 21 determines whether to notify each user serving as the executor of the print job of the fact that the print job is stored in the print server 2 (ACT 39). For example, when the executors of the print jobs include the user other than the sender of the print job, the processor 21 determines to notify the user other than the sender of the fact that the print job is stored. Further, when the executor of the print job is designated as the individual user, the processor 21 notifies each designated user of the fact that the print job is stored. When the executor of the print job is designated as the group, the processor 21 determines to notify each of the users belonging to the designated group.

If the processor 21 notifies each user who is able to execute the print job of the fact that the print job is stored in the print server 2 (YES in ACT 39), the processor 21 executes notification setting to notify each user of the fact that the print job is stored in the print server 2 (ACT 40). For example, when the notification for the print job is given by a mail, the processor 21 starts the notification by generating a message of the mail and setting the mail address of each user in the generated mail.

When the notification setting is completed, the processor 21 notifies each individual user of the fact that the print job is stored in the print server 2 (ACT 41) and ends the registration process.

Next, the storage form of the print job in the print server 2 will be described.

FIG. 9 is a diagram illustrating a first storage form of the print job in the print server 2.

In the example shown in FIG. 9, all the print jobs are distributed to the respective users and are stored. In the first storage form shown in FIG. 9, all the print jobs are stored for the respective users. Therefore, when the user (receiver) who is able to execute the print job is designated as the group, the print job (with the PJL data) is stored in each of the folders of all the users belonging to the designated group. In the configuration shown in FIG. 9, the print job may be deleted from the folder of the user whenever each user executes the print job.

Figure 10:
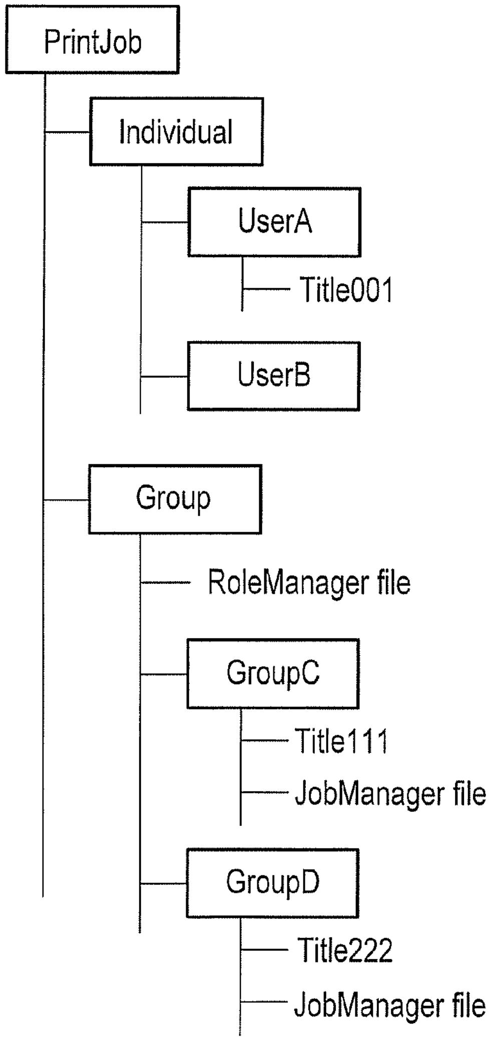
FIG. 10 is a diagram illustrating a second storage form of the print job in the print server.

FIG. 10 is a diagram illustrating a second storage form of the print job in the print server 2.

In the example shown in FIG. 10, the print job designating the individual user as the receiver is stored for each user and the print job designating the group as the receiver is stored for each group. In the second storage form shown in FIG. 10, a folder group of each individual user and a folder group of each group are provided as the storage region where the print jobs for the PULL print are stored.

When the user (receiver) who is able to execute the print job is designated as the group, the print job (with the PJL data) is stored in the folder of the designated group. In the second storage form, however, since one print job is stored in the file of each group, it is necessary to manage the execution state of the print job of each user. Therefore, in the second storage form shown in FIG. 10, a JobManager file is generated for each group and is stored together with the print job (with the PJL data) in the folder of each group. Further, a RoleManager file is stored in the upper level of the folder group of each group.

FIGS. 11 and 12 are diagrams illustrating examples of the structure of the JobManager file.

In the examples shown in FIGS. 11 and 12, the JobManager file stores “Title”, “Role”, “Count”, and “Time” for each print job in each group. The “Title” is an arbitrary character string used to identify the print job. The “Count” indicates the remaining number of times by which the print job is executed in the group. The initial value of the “Count” is set to the number of users belonging to the group. The value of the “Count” is counted down whenever the user belonging to the group executes the print job. Accordingly, the value of the “Count” becomes “0” when the print job is executed by the number of users belonging to the group. When the value of the “Count” becomes “0”, the print job is deleted from the folder of the group.

The value of the “Time” is a value indicating the storage period of the print job. The value of the “Time” may be a default value or the user terminal 1 may set the value when setting the print job. When the storage period defined in “Time” expires, the print job is deleted from the folder of the group. The “Role” indicates the option setting contents in the printing based on the print job. The details of the “Role” are designated in the RoleManager file.

FIG. 13 is a diagram illustrating an example of the structure of the RoleManager file.

In the example shown in FIG. 13, the RoleManager file stores “ColorMode”, “Duplex”, and “Nin1” as one piece of role information. The “ColorMode” is generated or selected with a unique title as one piece of role information. The "Duplex" indicates both-side printing setting. For example, when the "Duplex" is "0", the "Duplex" indicates single-side printing setting. When the "Duplex" is "1", the "Duplex" indicates both-side printing setting. The "Nin1" indicates setting in which the images corresponding to N pages are printed on one surface of the sheet. For example, when the "Nin1" is "1", the "Nin1" indicates setting of 1 in 1 (setting in which the image corresponding one page is printed on one surface). When the "Nin1" is "2", the "Nin1" indicates setting of 2 in 1 (setting in which the images corresponding two pages are printed on one surface).

FIG. 14 is a diagram illustrating a third storage form of the print job in the print server 2.

In the third storage form shown in FIG. 14, a JobCount file and a JobRole file are stored for each group. FIG. 15 is a diagram illustrating an example of the structure of the JobCount file and FIG. 16 is an example of the structure of the JobRole file.

In the example shown in FIG. 15, the JobCount file stores "Title", "Count", and "Time". In the example shown in FIG. 16, the JobRole file stores "Title" and "Role". The meanings of the "Title", "Count", "Time", and "Role" are the same as those of the JobManager file shown in FIGS. 11 and 12.

That is, in the third storage form shown in FIG. 14, the JobCount file stores the condition that the print job is deleted from the folder of the group and the JobRole file stores information indicating the setting contents when the user of the group executes the print job. The number of JobRole files may be two or more in each group. For example, the JobRole file may be provided for each user. When the JobRole file is provided for each user, the setting contents of the case of executing the printing job for each user can be designated. For example, the user who executes the print job in accordance with first setting contents and the user who executes the print job in accordance with second setting contents can be designated even in the same group.

In the JobRole file, the "Role" newly generated in the print setting from the user terminal 1 may be stored. This "Role" information may be realized in the format as that of each of the role information stored in the RoleManager file. The newly generated "Role" information is stored locally in the folder of each group. The newly generated "Role" information may be stored not only in the folder of the group unit but also in the folder of each individual user.

Figure 17:
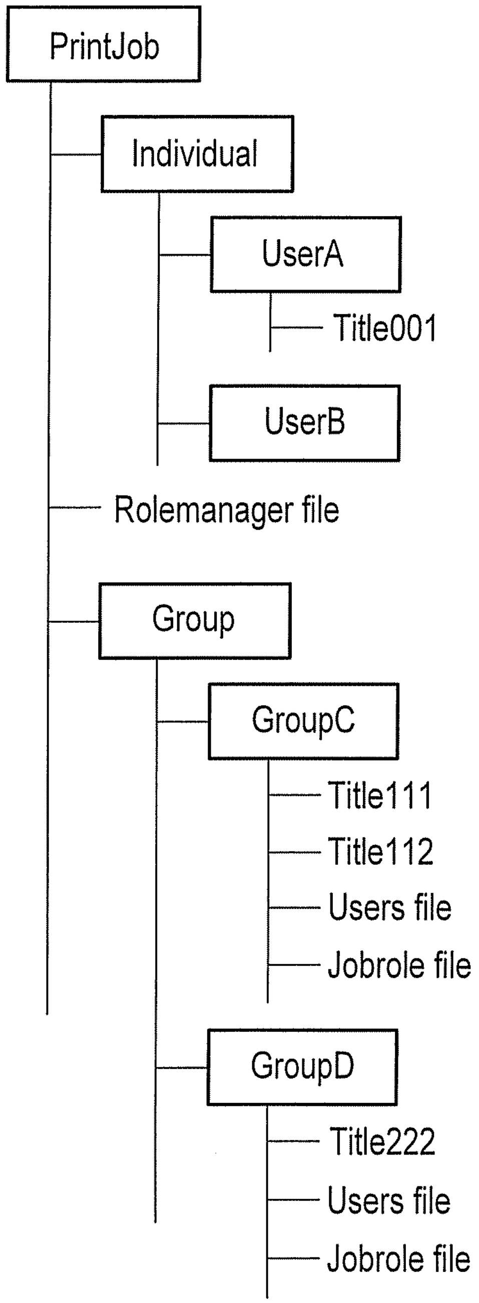
FIG. 17 is a diagram illustrating a fourth storage form of the print job in the print server.

FIG. 17 is a diagram illustrating a fourth storage form of the print job in the print server 2.

In the fourth storage form shown in FIG. 17, a Users file and a JobRole file are stored for each group. FIG. 18 is a diagram illustrating an example of the Users file.

The Users file stores information confirming whether the execution of the print job ends for each user in the group. In the example shown in FIG. 18, the Users file stores "Name" and "PrintOut tag of each Title" for each user. For example, when the user "user001" does not execute the print job of "Title111", the PrintOut tag of the "Title111" of the "user001" with "Name" is set to "0". When the user "user001" executes the print job of the "Title111", the PrintOut tag of the "Title111" of the "user001" is changed into "1".

The Users file shown in FIG. 18 is generated or updated, for example, in the process of registering the print job. When the print job selection screen is displayed on the display unit 36 of the image forming apparatus 3, the processor 21 of the print server 2 extracts the print jobs (the print jobs in which the printing is not executed) with the "PrintOut tag" of "0" from the Users file and displays the list of the extracted print jobs on the display unit 36.

Next, the execution process (transmission process) of the print job in the print server 2 will be described.

Figure 19:
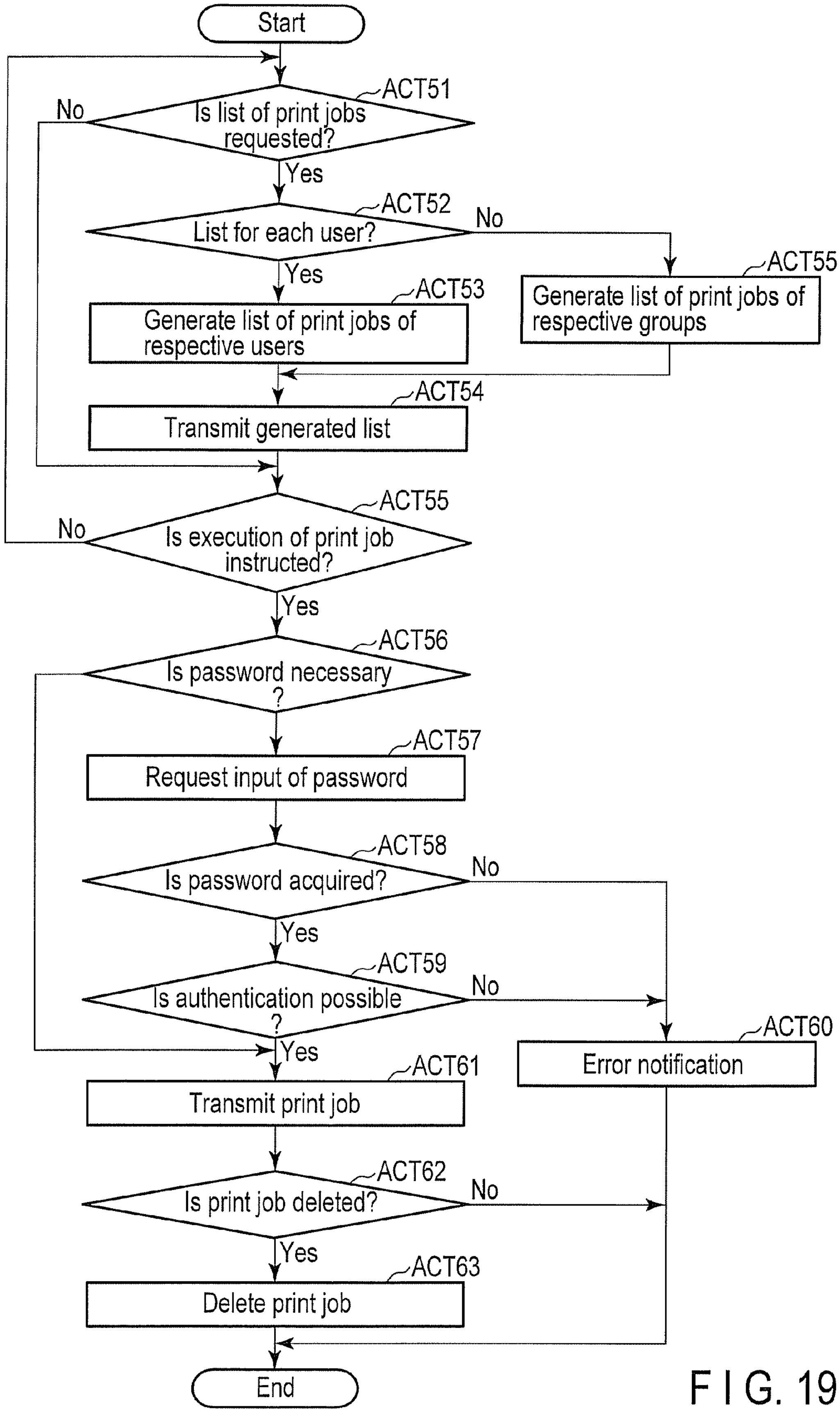
FIG. 19 is a flowchart illustrating an execution process (transmission process) of the print job in the print server.

FIG. 19 is a flowchart illustrating the execution process (transmission process) of the print job in the print server 2.

The print server 2 receives an access of each image forming apparatus 3 connected to the network 5 at any timing. For example, the print server 2 receives a display request for the list of the print jobs for the PULL print from any image forming apparatus 3. In the display request for the list of the print jobs for the PULL print, the image forming apparatus 3 designates the user or the group succeeding in authentication and requests the list of the print jobs of the individual user or the group. The processor 21 of the print server 2 determines whether the user is designated or the group is designated in the request for the list of the print jobs received from the image forming apparatuses 3.

If the individual user is designated (YES in ACT 52), the processor 21 extracts the print jobs that the users are able to execute from the JOB storage region 46*a* by the management function 46. The processor 21 generates the list indicating the extracted print jobs as the list of the print jobs of the respective users (ACT 53). For example, the processor 21 generates the list of the print jobs of the respective users displayed on the print job selection screen displayed by the display unit 36 of the image forming apparatus 3. The processor 21 transmits the generated list of the print jobs to the image forming apparatus 3 (ACT 54).

If the group is designated (NO in ACT 52), the processor 21 extracts the print jobs that the users belonging to the group are able to execute from the JOB storage region 46*a* by the management function 46. The processor 21 generates the list indicating the extracted print jobs as the list of the print jobs of the respective groups (ACT 55). For example, the processor 21 generates the list of the print jobs of the respective users displayed on the print job selection screen displayed by the display unit 36 of the image forming apparatus 3. The processor 21 transmits the generated list of the print jobs to the image forming apparatus 3 (ACT 54).

After the processor 21 transmits the list of the print jobs, the processor 21 of the print server 2 receives an execution instruction (transmission request) for the print jobs selected from the transmitted list of the print jobs (ACT 55). If the processor 21 receives the execution instruction for a specific print job from the image forming apparatus 3 (YES in ACT 55), the processor 21 determines whether a password is set in the print job instructed to be executed (ACT 56).

If the password is set in the print job instructed to be executed (YES in ACT 56), the processor 21 transmits an input request for the password to the image forming apparatus 3 which is a transmission source of the execution instruction for the print job (ACT 57). If the processor 21 acquires the password input from the image forming apparatus 3 by the user (YES in ACT 58), the processor 21 determines whether the password set in the print job is identical to the password acquired from the image forming apparatus 3 (ACT 59).

If the processor 21 may not acquire the password from the image forming apparatus 3 (NO in ACT 58) or if the password acquired from the image forming apparatus 3 is not identical (NO in ACT 59), the processor 21 transmits an error notification to the image forming apparatus 3 (ACT 66) and stops transmitting the print job instructed to be executed.

If the passwords are identical to each other (YES in ACT 59), the processor 21 reads the print job instructed to be executed from the JOB storage region 46*a* by the management function 46 and transmits the print job instructed to be executed to the image forming apparatus 3 (ACT 61). After the processor 21 transmits the print job, the processor 21 determines whether the print job is deleted (ACT 62). If the processor 21 determines that the print job is deleted (YES in ACT 62), the processor 21 deletes the print job transmitted to the image forming apparatus 3 (ACT 63) and ends the process.

For example, when each individual user can execute the print job only once and the transmitted print job is the print job read from the individual user, the processor 21 deletes the print job from the folder of the individual user. When the transmitted print job is the print job read from the folder of the group, the processor 21 updates the JobManager file, the JobCount file, or the Users file managing the execution state of the print jobs in each group, as described above, and determines whether to delete the print job from the folder of the group.

For example, when the storage form of the print jobs is the second storage form shown in FIG. 10, the processor 21 decreases the value of the "Count" in the JobManager file by "1" and determines whether to delete the print job depending on whether the value of the "Count" is "0". Further, when the storage form of the print jobs is the third storage form shown in FIG. 14, the processor 21 decreases the value of the "Count" in the JobCount file by "1" and determines whether to delete the print job depending on whether the value of the "Count" is "0". Furthermore, when the storage form of the print jobs is the fourth storage form shown in FIG. 17, the processor 21 updates the Print Out tag of the user into "1" (where the execution ends) in the Users file and determines whether to delete the print job depending on whether the tags of all the users of the print jobs completely ends.

Next, the execution process of the print job in the image forming apparatus 3 will be described.

FIG. 20 is a flowchart illustrating an execution process of the print job in the image forming apparatus 3.

The image forming apparatus 3 can gain access to the print server 2 executing the processes shown in FIG. 19 via the network 5 at any timing. Here, when the user starts operating the image forming apparatus 3 (or starts the PULL print), it is assumed that the processor 31 of the image forming apparatus 3 executes user authentication as a log-in process of the user.

That is, the processor 31 of the image forming apparatus 3 acquires the user ID, the authentication information, and the like input to log in the image forming apparatus 3 by the user (ACT 71). The authentication information may be information read from an IC card of the user by an IC card reader serving as the authentication information acquisition unit 39 or may be authentication information such as a password input through the operation unit 37 by the user. When the processor 31 acquires the user ID and the authentication information, the processor 31 transmits an authentication request to the print server 2 (ACT 72). After the processor 31 transmits the authentication request, the processor 31 receives the authentication result from the print server 2.

If the processor 31 receives a notification for user authentication success from the print server 2 (YES in ACT 73), the processor 31 displays a menu screen (ACT 74) and receives a selection of the PULL print as one of the print functions. If the PULL print is selected (YES in ACT 75), the processor 31 requests the print server 2 to transmit the list of the print jobs of each individual user or the list of the print jobs of each group in response to the operation from the user.

For example, if the processor 31 requests the print server 2 to transmit the list of the print jobs of the individual user (YES in ACT 76), the processor 31 requests the print server 2 to transmit the list of the print jobs designating the users succeeding in the authentication (ACT 77). The print server 2 generates the list of the print jobs of the designated users and transmits the list of the print jobs of the designated users to the image forming apparatus 3. The processor 31 of the image forming apparatus 3 displays the list of the print jobs of the respective users received from the print server 2 on the display unit 36 (ACT 78). For example, the display unit 36 displays the list of the print jobs of the respective users as a print job selection screen used for the user to select a specific print job.

If the processor 31 requests the print server 2 to transmit the list of the print jobs of the respective groups (YES in ACT 79), the processor 31 requests the print server 2 to transmit the list of the print jobs designating the group to which the users succeeding in the authentication belong (ACT 80). The print server 2 generates the list of the print jobs of the designated groups and transmits the list of the print jobs of the designated groups to the image forming apparatus 3. The processor 31 of the image forming apparatus 3 displays the list of the print jobs of the respective groups received from the print server 2 on the display unit 36 (ACT 81). For example, the display unit 36 displays the list of the print jobs of the respective users as a print job selection screen used for the user to select a specific print job.

Figure 21:
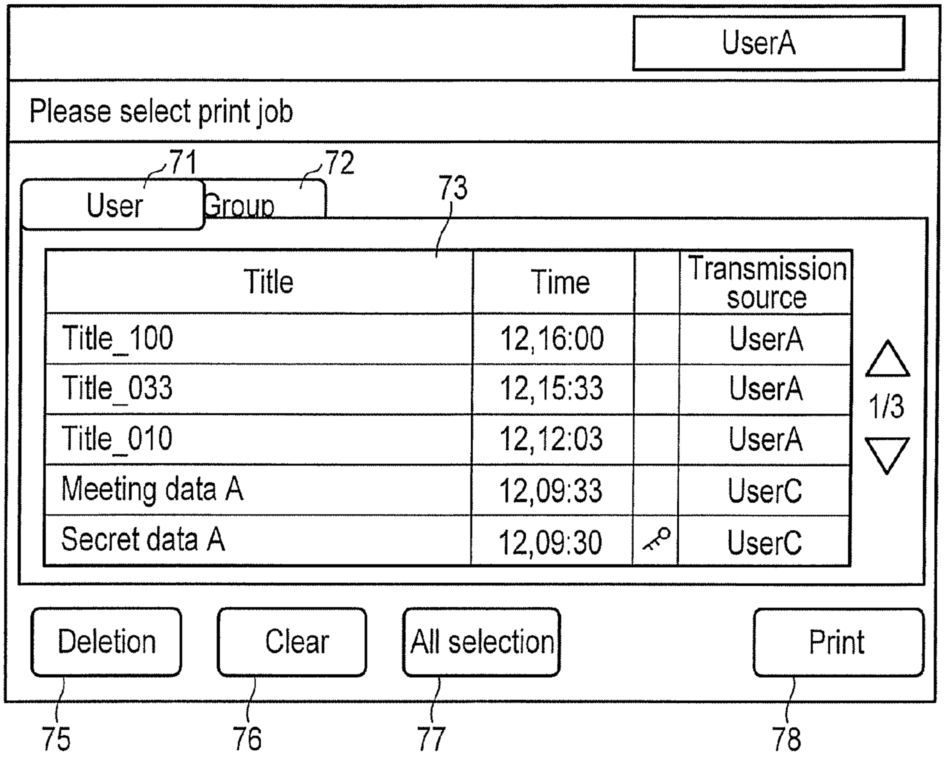
FIG. 21 is a diagram illustrating a display example of the list of the print jobs of the respective users.
Figure 22:
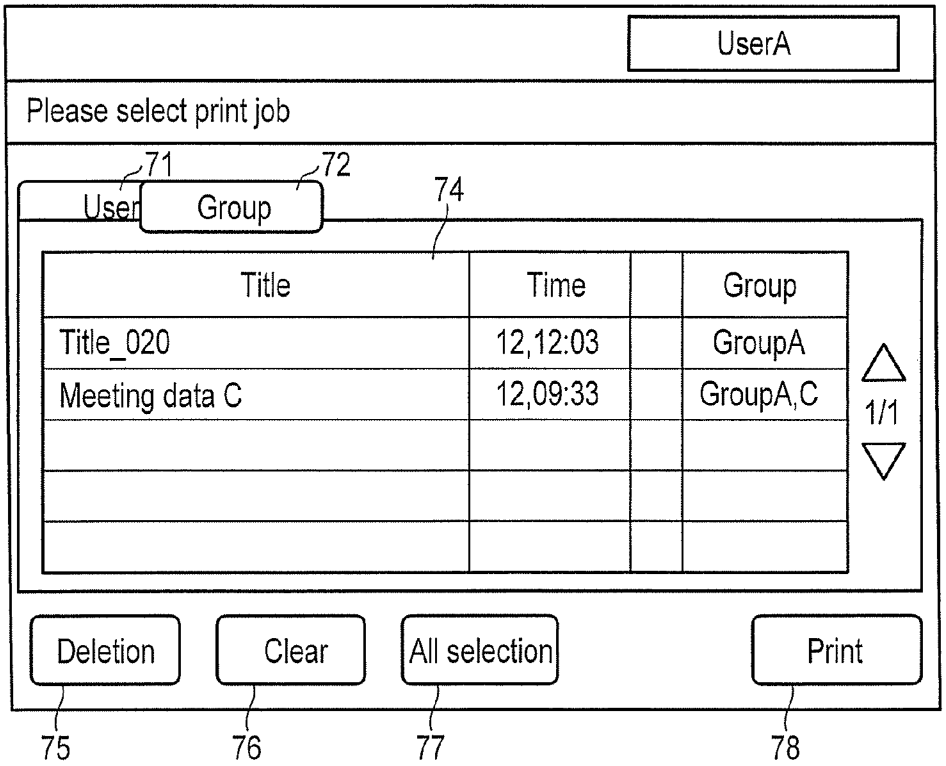
FIG. 22 is a diagram illustrating a display example of the list of the print jobs of the respective groups.

FIG. 21 is a diagram illustrating a display example of the print job selection screen including the list of the print jobs of the respective users. FIG. 22 is a diagram illustrating a display example of the print job selection screen including the list of the print jobs of the respective group.

In FIGS. 21 and 22, the display examples are switched in response to the input of tabs 71 and 72. The tab 71, the tab 72, a list 73 (or 74), a deletion button 75, a clear button 76, an all selection button 77, and a print button 78 are displayed on the print job selection screen shown in FIGS. 21 and 22.

The tab 71 instructs the display of the list of the print jobs of the respective users. The tab 72 instructs the display of the list of the print jobs of the respective users. The list 73 is an example of the list of the print jobs of the respective users displayed when the tab 71 is selected. The list 74 is an example of the list of the print jobs of the respective groups displayed when the tab 72 is selected. The deletion button 75 is a button used to instruct the deletion of the selected print jobs. The clear button 76 is a button used to instruct clearing of the selection contents or the like. The all selection button 77 is a button used to instruct all the print jobs displayed in the list so as to be selected. The print button 78 is a button used to instruct the execution of the printing by the selected print jobs.

That is, when the tab 71 displayed as "User" is selected, the display unit 36 displays the list 73 of the print jobs (the list of the print jobs in which a user A is designated) of the individual users, as shown in FIG. 21. Further, when the tab 72 displayed as "Group" is selected, the display unit 36 displays the list 74 of the print jobs (the list of the print jobs in which a group A is designated) of the respective groups, as shown in FIG. 22.

In the display example shown in FIG. 21, the user (sender) of the transmission source of each print job is displayed. When the sender is the user himself or herself, the print job means that the print job is sent by the user himself or herself. For example, in the display example shown in FIG. 21, the print job of the sender User A is the print job that the User A himself or herself transmits (sets). As shown in FIG. 21, by displaying the senders in correspondence with the respective print jobs, it is possible to easily recognize whether each print job is the print job that the user himself or herself transmits or the transmit job that another user transmits.

In the display example shown in FIG. 22, the group is displayed as the executor for each print job. For example, in the display example shown in FIG. 22, the print job in which Group A is designated and the print job in which Group A and Group C are designated are displayed. By displaying the groups that are able to execute the print jobs, the user can recognize that each print job is the print job permitted to be executed in a given group, and thus can predict the kinds of print jobs.

The user can select one print job and instructs the execution of the print job on the print job selection screen including the list of the print jobs of the respective users and the list of the print jobs of the respective groups. If the processor 21 receives an instruction for the execution of the selected one print job (YES in ACT 82), the processor 21 determines whether a password is set in the print job (ACT 83). If the password is set (YES in ACT 83), the processor 21 displays the password input screen on the display unit 36 (ACT 84) and prompts the user to input the password.

When the user inputs the password, the processor 31 requests the print server 2 to combine the password input for the print server 2 and the password set for the print job (ACT 85). When the image forming apparatus holds the password set for the print job, the password input by the processor 31 may be combined with the password for the print job.

If the combination of the passwords fails (NO in ACT 86), the processor 31 displays an error notification on the display unit 36 (ACT 87) and stops this process. Even if the combination of the passwords fails, the input of the password may be received again up to a predetermined number of times and the process may be executed from ACT 84 described above.

If the combination of the passwords succeeds (YES in ACT 86), the processor 31 receives the print job from the print server 2 (ACT 88). After the processor 31 receives the print job, the processor 31 allows the printer 38 to execute the printing based on the print job (ACT 89).

In the image forming system, as described above, the print server registers the print job designated by the other users other than the sender set as the executor and the MFP executes the print job registered in the print server in response to the operation of the executor other than the sender. According to the image forming system, the print data can be exchanged with the other users other than the user himself or herself without actually printing the print data on a recording medium. Further, since each user designated as the executor of the print job can select whether to execute the printing by himself or herself, unnecessary printing can thus be reduced.

When the print job designating the other users other than the sender as the executor is registered, the print server notifies each user set as the executor of the print job of the fact that the print job is registered. According to the image forming system, the other users can inform each user of the executable print job registered in the print server.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A user terminal comprising:

a display unit which displays a setting screen;

an operation unit which inputs information in accordance with the setting screen displayed on the display unit;

a processor which displays the setting screen including a setting for user allowed for printing, sets a user designated by the operation unit on the setting screen displayed on the display unit as a user allowed for printing, and generates data indicating a printing job including information indicating the set user allowed for printing; and an interface which transmits data indicating the printing job generated by the processor to a print server managing the printing job.

2. The user terminal according to claim 1, wherein the processor displays a candidate list indicating user candidates settable as a user allowed for printing, and receives designation of a user allowed for printing from the candidate list.

3. The user terminal according to claim 2, wherein the processor displays a group to which the user candidates gettable as a user allowed for printing belong on the candidate list, and receives selection of group from the candidate list as designation of a user allowed for printing.

4. The user terminal according to claim 1, wherein the processor displays on a setter list a user allowed for printing designated by the operation unit on the setting screen displayed on the display unit, and generates data indicating a printing job in which the user displayed on the setter list is set as a user allowed for printing when a setting is determined.

5. The user terminal according to claim 4, wherein the processor receives deletion of user designated by the operation unit from the setter list.

6. The user terminal according to claim 1, wherein the processor receives designation of acceptance or denial of the printing job by an operator operating the operation unit.

7. The user terminal according to claim 1, wherein the processor further receives designation of password relative to the printing job, and when a password is designated for the printing job, generates data indicating the printing job in which the designated password is set.

8. The user terminal according to claim 1, wherein the processor further receives designation of printing mode relative to the printing job, if a printing mode is designated to the printing job, generates data indicating the printing job in which the printing mode is designated.

* * * * *